Figure 1:
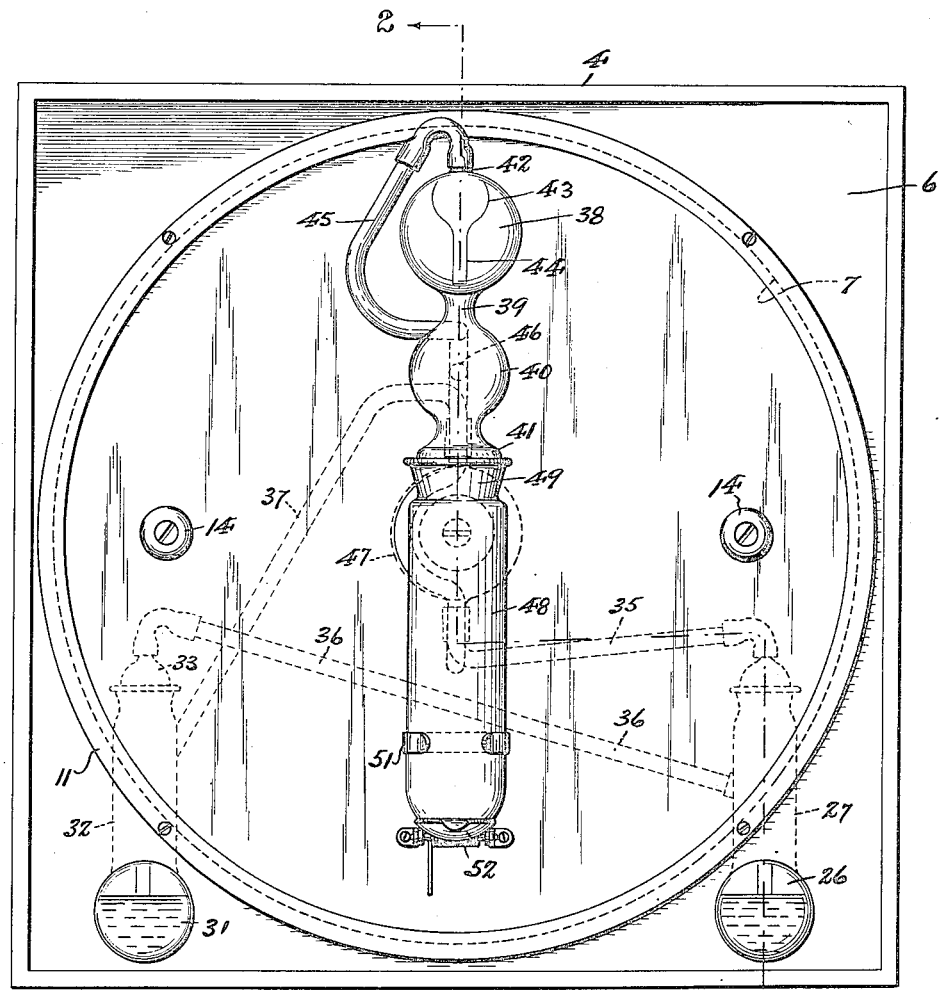

Apr. 24, 1923.

H. F. SAVOYE 1,452,709

APPARATUS FOR PREPARING ARTIFICIAL RADIOACTIVE WATER

Filed Feb. 8, 1922   2 Sheets-Sheet 1

INVENTOR.
Herbert F. Savoye,
BY
Frantz and Richards,
ATTORNEYS.

Apr. 24, 1923.

H. F. SAVOYE 1,452,709

APPARATUS FOR PREPARING ARTIFICIAL RADIOACTIVE WATER

Filed Feb. 8, 1922   2 Sheets-Sheet 2

INVENTOR.
Herbert F. Savoye,
BY
Fraentzel and Richards
ATTORNEYS.

Patented Apr. 24, 1923.

1,452,709

UNITED STATES PATENT OFFICE.

HERBERT F. SAVOYE, OF HACKENSACK, NEW JERSEY, ASSIGNOR TO AMERICAN RADIUM APPLIANCE COMPANY, OF MORRISTOWN, NEW JERSEY, A CORPORATION OF NEW JERSEY.

APPARATUS FOR PREPARING ARTIFICIAL RADIOACTIVE WATER.

Application filed February 8, 1922. Serial No. 534,900.

*To all whom it may concern:*

Be it known that I, HERBERT F. SAVOYE, a citizen of the United States, residing at Hackensack, in the county of Bergen and State of New Jersey, have invented certain new and useful Improvements in Apparatus for Preparing Artificial Radioactive Water; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in apparatus for charging liquids with radium emanations; and the invention has reference, more particularly, to a novel construction of apparatus for producing an artificially prepared radioactive water, whereby radium emanations are captured and circulated through a given volume of water until the desired degree of saturation of the water by the soluble principles of the radium emanations is attained.

I am aware that it has heretofore been the practice to prepare radioactive water by first passing a stream of purified air through a solution of radium salt to take up radium emanations, and then to bubble the air, so utilized as a vehicle for said radium emanations, through the water to be treated whereby the soluble principles of the radium emanations are absorbed by the water from said air, consequently my prevent invention is confined to providing a novel construction of apparatus for practicing such general method in such a manner that the air serving as the transferring vehicle or agent may be repeatedly circulated through both the radium salt solution and the water, in a very convenient manner, and by a simple manipulation performed by the operator, so that a desired maximum degree of saturation of the given volume of water with soluble radium principles may be easily and quickly attained. To this end the apparatus comprises a fixed or stationary container holding a purifying agent, such as an alkali solution, a second fixed or stationary container holding a radium preparation, such as a radium salt solution, said second container being operatively connected in communication with said first container, and a vertical turn-table device upon which is mounted a pair of intercommunicating water chambers or containers, so arranged that a manipulation of the turn-table will dispose the water chambers or containers to cause a volume of water to flow by gravity from one container to the other, said containers being interconnected through a reversing valve device respectively in communication with said purifying agent container and said radium preparation container. The above described elements of the apparatus being so arranged in cooperative relation, that circulation of air through the system is produced by the displacement of air from the chamber or container receiving the flow of water thereinto, thus eliminating the necessity of mechanical pumping devices, and permitting repeated circulation of air through the system merely by alternately elevating one water container or chamber above the other, whereby the air is repeatedly circulated through the radium solution to take up radium emanations therefrom and deliver the same to the water for absorption thereby, until a desired degree of saturation of the water is attained.

Other objects of this invention, not at this time more particularly enumerated, will be clearly understood from the following detailed description of the same.

With the various objects of this invention in view, the same consists, primarily, in the novel apparatus for producing artificially prepared radioactive water; and, the invention consists, furthermore, in the novel arrangements and combinations of the several devices and parts, as well as in the details of the construction of the same, all of which will be more fully described in the following specification, and then finally embodied in the claims appended thereto.

The invention is clearly illustrated in the accompanying drawings, in which:—

Figures 2, 3:
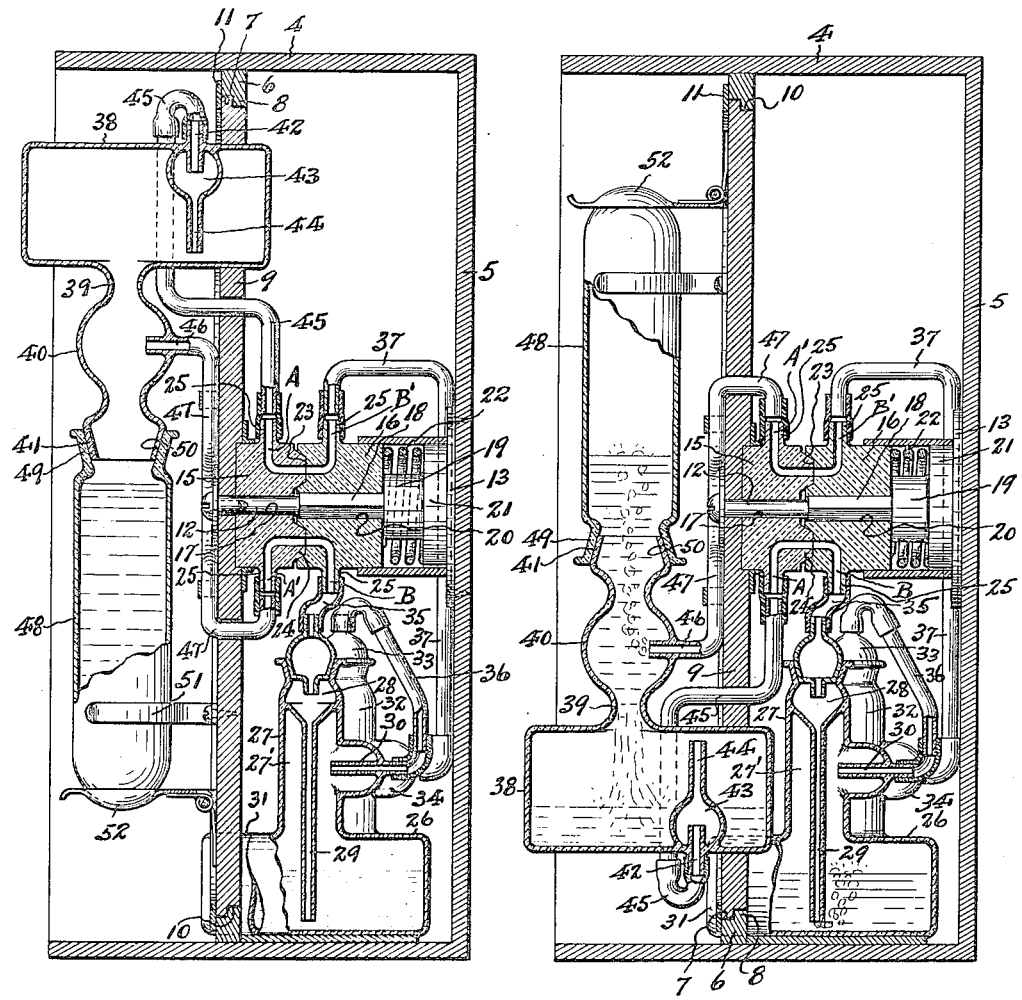

Figure 1 is a face view or front elevation of the novel apparatus, made according to and embodying the principles of this invention; Figure 2 is a vertical longitudinal cross section, taken on line 2—2 in said Figure 1, and showing the water chambers or containers in one position; Figure 3 is a view similar to that shown in Figure 2, but illustrating the position of the water chambers or containers as reversed by the turning of the turn-table upon which they are mounted.

Similar characters of reference are employed in all of the hereinabove described views, to indicate corresponding parts.

Referring now to said drawings, the reference character 4 indicates a casing of suitable conformation, and preferably open at its forward end. Arranged within said casing 4, intermediate its rear wall 5 and its forward open end, is a transverse vertical partition 6. Said partition 6 is provided with a circular central opening 7 having an internal flange or shoulder 8. Fitted into said opening 7, so as to be rotatably movable therein is a turntable 9, the same possessing an annular seat portion 10 which abuts against said flange or shoulder 8 to retain the turn-table against displacement in one direction from the vertical plane of said partition 6. A keeper ring 11 is secured to said partition 6 to overlap the marginal portions of said turn-table to retain the same against displacement in the opposite direction from the vertical plane of said partition 6. Said turn-table is rotatably mounted upon a central journal stud 12, the base 13 of which is secured to said rear wall 5 of the casing 4 so that said stud is fixed to extend forwardly through the casing to receive and pivot said turn-table on its free end. As thus mounted the said turn-table is free to be rotated in a vertical plane, and to provide means whereby the operator may apply a rotative force to said turn-table, the same is provided upon its outer face with one or more handle members 14.

Associated with said turn-table 9 is a reversing valve mechanism comprising a movable or rotatable valve member 15 and a non-rotatable valve member 16 which are axially alined together for mutual cooperation. Said movable or rotatable valve member 15 is provided with a central axial opening 17 whereby the same may be engaged on said journal stud 12. Said movable or rotatable valve member 15 is suitably secured to the back of said turn-table so as to rotate therewith. Said journal stud 12 is provided with a shank portion 18 of square cross-sectional shape, at the rearward termination of which is a stop boss 19 of enlarged diameter. Said non-rotatable valve member 16 is provided with an axial opening 20 corresponding in shape to the shape of said shank-portion 18, so that said non-rotatable valve member may be non-rotatably supported upon said shank member in line with said rotatable valve member, the adjoining end faces of the valve-members meeting together. Formed in connection with the base 13 is a seating boss 21 about which is disposed one end of a compression spring 22, the opposite end of which thrusts against the rear end of said non-rotatable valve member to assure and maintain the meeting faces of the valve members in operative contact one with another. It is preferable to provide the meeting face of one of the valve members, e. g. the valve member 16, with an annular ground seat or female portion 23, and the meeting face of the other valve member, e. g. the valve member 15, with an annular male portion 24 receivable in said seat, thus providing a leak-proof joint between the rotatable and non-rotatable valve members. The rotatable valve member 15 is provided with a pair of valve ports, diametrically disposed in opposite relation, one valve port being indicated by the reference character A and the other by the reference character A'. Preferably said valve ports enter the sides of said valve member 15 and turn to dispose their inner ends at the meeting face of the same. The non-rotatable valve member 16 is provided with a pair of valve ports, also diametrically disposed in opposite relation, one port being indicated by the reference character B and the other by the reference character B'. Said valve ports B and B' also enter the sides of said valve member 16 and turn to dispose their inner ends at the meeting face of the same, and respectively initially alined and in communication with the inner ends of the ports of the valve member 15. The outer ends of the several valve ports are preferably provided with outwardly projecting necks 25. From the above description and an inspection of the drawings, it will be clearly understood that half revolutions imparted to the rotatable valve member 15 will alternately reverse or interchange the relation of the valve ports A and A' to the valve ports B and B'.

Fixed within said casing 4, toward one side thereof and intermediate the rear wall 5 and the partition 6, is a container 26, preferably made of glass, having a perpendicular dome-portion 27. Connected with the upper end of said dome-portion and separated from the dome chamber 27' is an air receiving chamber 28 from which extends downwardly through said dome-chamber into the interior of said container 26 a tubular air passage or duct 29 which terminates just short of the bottom of said container 26. Connected with said dome-portion 27, and in communication with the dome chamber 27' is an air outlet passage or duct 30.

Fixed within said casing 4, toward the opposite side thereof and also intermediate the rear wall 5 and the partition 6, is a second container 31, preferably made of glass, having a perpendicular dome-portion 32 provided with an air receiving portion 33 at its upper end and an air discharge portion 34 in its side. The internal structure of the second container 31 is the same in detail as that of the container 26 above described.

The respective outer ends of the respective containers 26 and 31 may be disposed in openings provided in the partition 6, whereby the contents of the respective containers may be viewed through the transparent ends thereof, whereby it may be easily determined that each container holds a proper amount of the particular solution adapted to be placed therein.

The container 26 is adapted to hold a solution of caustic alkali, or other suitable agent adapted to purify an air stream passed therethrough by freeing said air from its carbon dioxide content.

The container 31 is adapted to hold a solution of a radium salt, or other suitable radium solution adapted to provide a radium emanation.

The air receiving chamber 28 of said container 26 is connected in communication with said valve port B by a suitable tubular duct member 35, while the air receiving portion 33 of said container 31 is connected in communication with the air outlet passage or duct 30 of the container 26 by a tubular duct member 36, and the air outlet or discharge portion 34 of the container 31 is connected in communication with the valve port B' by a tubular duct member 37.

Fixed upon said turn-table 9 is a stationary water container 38, having at its normally lower side a transfer passage 39 provided with an enlarged portion or air trap 40 intermediate said container and its free end. The free end 41 of said transfer passage 39 is preferably tapered as indicated in the drawings. Said fixed water container 38 is provided in its normally upward side with an air passage or port 42, associated with the inner end of which is a trap chamber 43 from which extends an air duct 44 adapted to terminate short of the normally lower side or bottom of said container. Said passage or port 42 is connected in communication with the port A of said rotatable valve member 15 by a suitably formed and disposed tubular air duct 45. Said enlarged portion or air trap 40 of the transfer passage 39 of said container 38 is provided with an air passage or port 46, which is connected in communication with the port A' of said rotatable valve member 15 by a suitably formed and disposed tubular air duct 47.

The reference character 48 indicates a removable or detachable water container, the same being closed at its normally lower end, but provided at its upper end with an open neck-portion 49 having a tapered seat 50 to engage the same with the free end 41 of the transfer passage 39 of the fixed or stationary water container 38. The means for holding said detachable water container 48 upon the turn-table 9, and in proper operative relation to the fixed container 38, comprises a resilient holding clip 51 adapted to embrace said container 48, and a spring-actuated bottom support 52, both of which members are mounted on said turn-table 9. It will be understood, however, that I may employ any other suitable mechanical means for detachably supporting the container 48 upon the turn-table 9, since the means shown in the drawings and above described are merely illustrative.

In operating the apparatus, a detachable container 48 is filled with the water which it is desired to charge with radium emanations, and the same is then attached to the turn-table 9 in operative relation to and in communication with the stationary container 38. In this position the container 38 is elevated above the container 48. The operator now manipulates the turn-table 9 to produce a half turn or revolution thereof, whereby the relative positions of the containers 38 and 48 are reversed, so that the container 48 is perpendicularly above the container 38, the apparatus being then arranged as shown in Figure 3 of the drawings. It now follows that the water in the container 48 will flow by gravity from said container 48 through the transfer passage 39 into the container 38, and as the latter fills up the air trapped therein is forced out by displacement, through the duct 44, trap 43 and passage 42 into the tubular duct 45, whence it passes through the valve port A of the valve member 15 into the valve port B of the valve member 16, and thence into the container 26 through the duct 29. Since the container 26 holds a purifying agent or solution, and since the terminal of the duct 29 is submerged in said solution, it follows that the air in escaping from the duct 29 must bubble up through the cleansing solution, and escaping from said solution in purified condition, the air then passes into the dome-chamber 27' making its exit therefrom through the passage 30. The air is thereupon forced through the tubular duct 36 into the container 31 which holds the solution of radium salt, and since the construction of said container 31 is similar to that of the container 26, it follows that the air will be forced to bubble upwardly through said radium solution, thereby taking up into its stream a proportion of the radium emanations given off by said solution. Escaping from the container 31 the air, with the accompanying radium emanations, is conveyed by the tubular duct 37 to the valve port B' of the valve member 16, and delivered thereby to the valve port A' of the valve member 15, whence it passes onward through the tubular duct 47 and through the passage or port 46 into the trap 40. As the air with the radium emanations passes into the trap 40 it meets the downward flowing stream of water passing from the container 48 into the container 38, and is consequently forced to bubble up through the water, thereby conveying the soluble principles of the radium emanation, for which it is the vehicle, into intimate contact with the water, whereby the latter is enabled to absorb or take up said soluble principles of the radium emanation, and to be thereupon charged therewith. The air thus circulated replaces the water in the container 48 as the latter empties itself.

After the water has entirely emptied itself from the container 48 into the container 38, the operator again gives the turn-table 9 a half turn, to again reverse the positions of the said containers, while at the same time the reversing valve member is operated to reverse the relation of the ports A and A' of the rotatable valve member 15 relative to the ports B and B' of the fixed valve member 16, the parts then occupying the positions shown in Figure 2 of the drawings, except that it will be understood that the partially charged water is in the container 38. It now follows that the water will flow by gravity from said container 38 through the transfer passage 39 into the container 48, and as the water enters the latter it will displace the air collected therein, and will force the same into the trap 40 to pass outwardly through the passage 46 to be led by the duct 47 to the valve port A' of the rotatable valve member 15. The reversing operation of the valve member 15 has reversed the position of the port A' so that now the same is in communication with the port B of the valve member 16, and consequently the air is again forced through the containers 26 and 31, to again take up from the radium solution in the latter container, another supply of the radium emanations given off thereby, so that the air with its second burden of said radium emanations is passed to the valve port B' and thence through the reversed valve port A to pass onward through the ducts 45 and 44 to be liberated within the container 38. Since the duct 44 is submerged in the water contained in said container 38, it follows that the air will, in escaping from the duct 44, bubble upwardly through the water, so that its burden of radium emanation is subjected to the soluble action of the water whereby additional soluble principles of the radium emanation are taken up by the water.

It will be clear that the operator may repeat the above described operations ad libitum, until the desired degree of saturation of the water with the soluble principles of the radium emanations is attained. When the water is charged to the degree desired, the container 48 may be removed and sealed until used, and a new container with a new volume of water may be connected operatively with the apparatus.

It will be understood from the above description of the construction and functioning of my novel apparatus, that the same offers a very compact, simple and easily manipulated arrangement, whereby a given volume of water may receive successive deliveries or charges of radium emanation until the desired degree of saturation is attained, and this is accomplished without the employment of mechanical pumps or other mechanical means for circulating the air which acts as a transferring vehicle between the radium solution and the water to be treated, since the circulation of the air is caused by the displacement thereof by the gravitation of the water from one container to another, which factor in combination with the reversing valve mechanism renders the device capable of continued operation so long as desired.

I am aware that some changes may be made in the several arrangements and combinations of the devices and parts, as well as in the details of the construction of the same, without departing from the scope of this invention as set forth in the foregoing specification, and as defined in the appended claims. Hence, I do not limit my invention to the exact arrangements and combinations of the various devices and parts as described in said specification, nor do I confine myself to the exact details of the construction of said parts as illustrated in the accompanying drawings.

I claim:—

1. In an apparatus for charging a fluid with radium emanation, a means for holding a radium solution, a pair of containers arranged one above the other to receive the fluid to be treated, means for reversing the relative positions of said containers whereby the fluid may be caused to alternately flow from one to the other thereof, an air conveying means interconnecting said containers with said radium solution holding means, and said air conveying means including a reversing valve, all whereby the fluid in flowing from one container to the other will displace air from the latter and circulate the same through said radium solution for return to the former after bubbling through the fluid for the purposes described.

2. In an apparatus for charging a fluid with radium emanation, a stationary container to hold an air purifying agent, a second stationary container to hold a radium solution, a pair of containers arranged one above the other to receive the fluid to be treated, means for reversing the relative positions of said latter containers whereby the fluid may be caused to alternately flow from one to the other, an air conveying means interconnecting said latter containers in series with said purifying agent container and said radium solution container, and said air conveying means including a reversing valve, all whereby the fluid flowing from one container to the other will displace the air from the latter and circulate the same through the purifying agent and radium solution for return to the former after bubbling through the fluid for the purposes described.

3. In an apparatus for charging a fluid with radium emanation, a container holding caustic alkali, a container holding a solution of radium salt, a reversible two compartment container for holding the fluid to be treated, and an air circulating means including a reversing valve, all whereby the flow of fluid from one compartment to the other of said fluid container will circulate air successively through said caustic alkali, the radium salt solution and said fluid to be treated.

4. In an apparatus for charging a fluid with radium emanation, a container holding caustic alkali, a container holding a solution of radium salt, a turn-table, a pair of containers to hold the fluid to be treated mounted one above the other on said turn-table, a rotation of said turn-table operating to alternately reverse the positions of said fluid containers to permit the flow of fluid from one to the other, an air circulating means including a reversing valve interconnecting said fluid containers with said containers holding the caustic alkali and the radium salt solution, said reversing valve being operated by the rotation of said turn-table, all whereby the flow of fluid from one fluid container to the other will circulate air successively through said caustic alkali, the radium salt solution and said fluid to be treated.

5. In an apparatus for charging a fluid with radium emanation, a container holding caustic alkali, a container holding a solution of radium salt, a turn-table, a reversing valve device comprising a rotatable valve member having a pair of valve ports and a fixed valve member having a pair of valve ports, said rotatable valve member being secured to said turn-table, air conveying means extending from one valve port of said fixed valve member through said containers holding the caustic alkali and radium salt solution back to the other valve port of said fixed valve member, a pair of containers to hold the fluid to be treated mounted one above the other on said turn-table, a rotation of said turn-table operating to alternately reverse the positions of said fluid containers to permit the flow of fluid from one to the other, an air conveying means interconnecting one valve port of said rotatable valve member with said fluid containers at one point, and a second air conveying means interconnecting the opposite valve port of said rotatable valve member with said fluid containers at another point, all arranged so that the flow of fluid from one container to the other will displace air from the latter and circulate the same successively through said caustic alkali, radium salt solution and fluid to be treated for return to the former container for the purposes described.

6. In an apparatus for charging a fluid with radium emanation, a container holding caustic alkali, a container holding a solution of radium salt, a turn-table, a reversing valve device comprising a rotatable valve member having a pair of valve ports and a fixed valve member having a pair of valve ports, said rotatable valve member being secured to said turn-table, air conveying means extending from one valve port of said fixed valve member through said containers holding the caustic alkali and radium salt solution back to the other valve port of said fixed valve member, a container to receive the fluid to be treated mounted in fixed relation to said turn-table, said fixed fluid container having an air port means entering the same, said fixed fluid container having a transfer passage means provided with an air trap, said air trap having an air port means, a second fluid container mounted in detachable relation to said turn-table, said second fluid container being coupled with the free end of said transfer passage means to connect the same in communication with said fixed fluid container, air conveying means interconnecting said air port means of said fixed container with one valve port of said rotatable valve member, and a second air conveying means interconnecting said air port means of said air trap with the other valve port of said rotatable valve member, substantially as and for the purposes described.

In testimony that I claim the invention set forth above I have hereunto set my hand this 18th day of January, 1922.

HERBERT F. SAVOYE.

Witnesses:
GEORGE D. RICHARDS,
ADOLPH HANSON.